Oct. 2, 1934.  M. COUSIN  1,975,502
TRANSMISSION BELT OR CHAIN FOR INTERNAL COMBUSTION MOTORS OR THE LIKE
Filed March 16, 1932   2 Sheets-Sheet 1
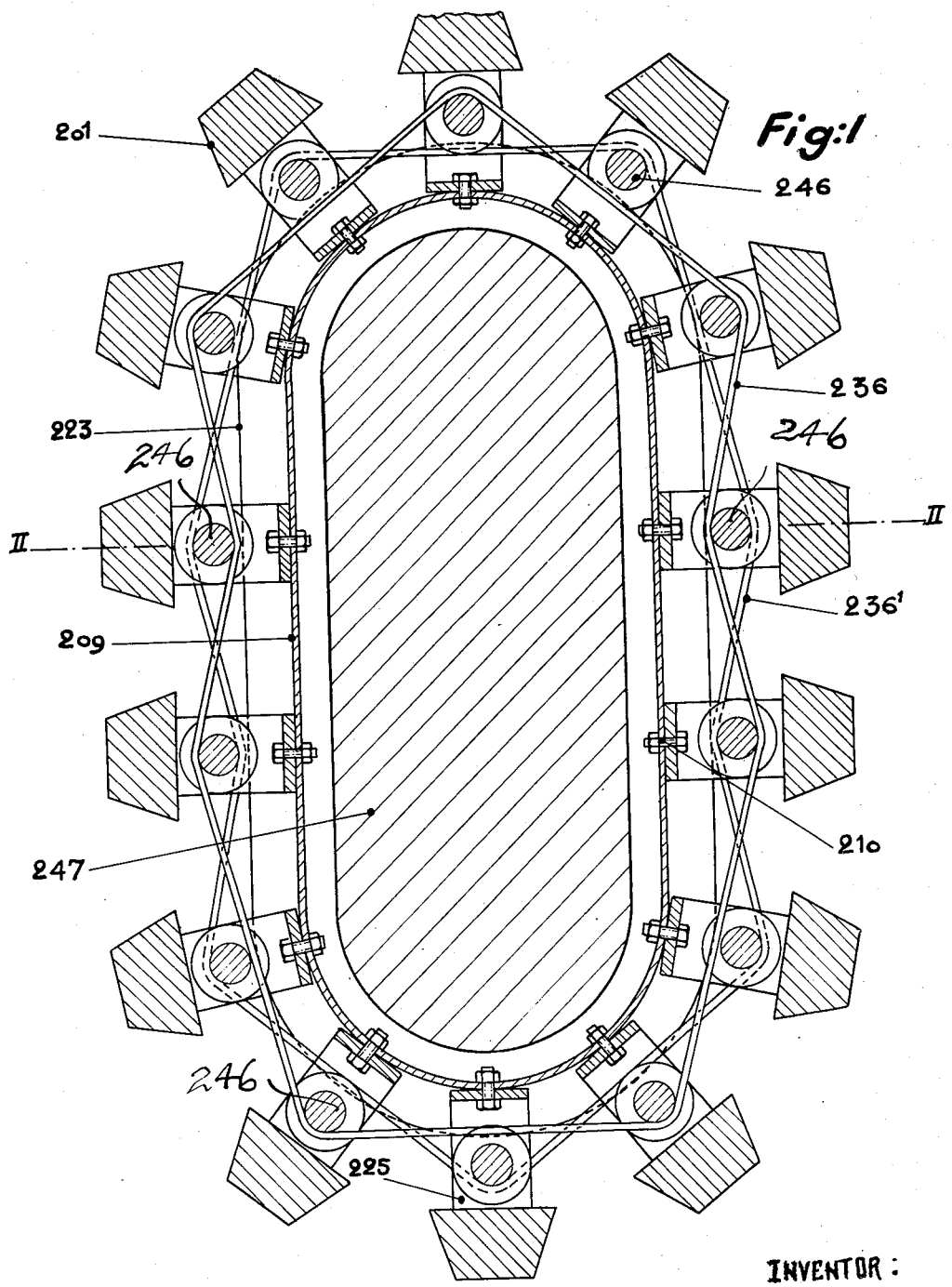
INVENTOR:
MAURICE COUSIN,
By Townsend + Decker,
ATTORNEYS.

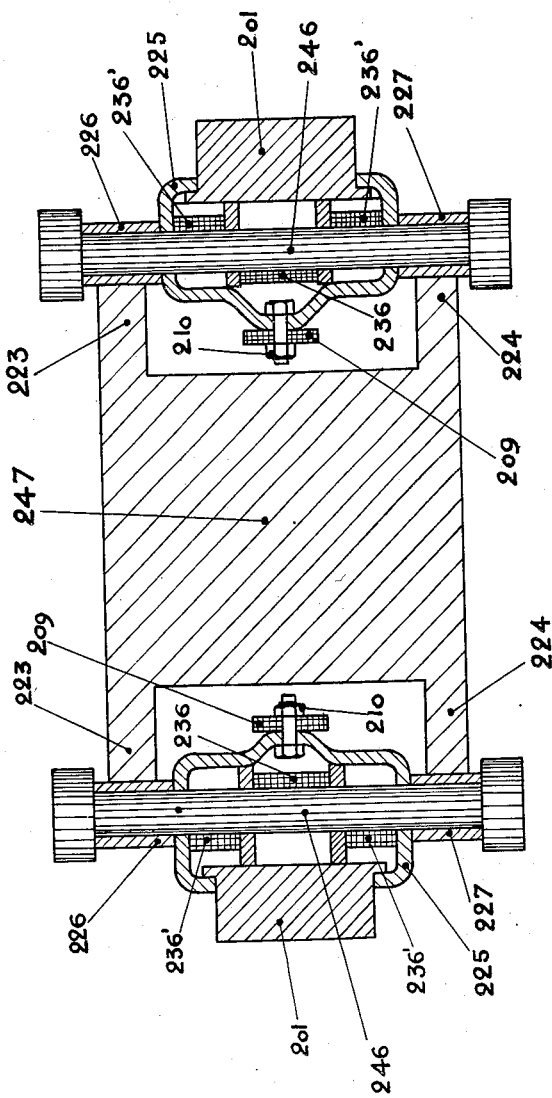

Patented Oct. 2, 1934

1,975,502

UNITED STATES PATENT OFFICE 1,975,502

TRANSMISSION BELT OR CHAIN FOR INTERNAL COMBUSTION MOTORS OR THE LIKE

Maurice Cousin, Paris, France

Application March 16, 1932, Serial No. 599,086
In France February 27, 1931

6 Claims. (Cl. 74—7)

This invention relates to transmission chains or belts for motors, pumps and the like, and particularly to that machine element thereof having to do with the rotor of a rotary type of such motor or pump. The present application is a continuation in part and relates back to my prior applications Serial No. 236,905, filed December 1, 1927, and Serial No. 331,626, filed January 10, 1929.

In general, motors of the type to which the transmission chain or element disclosed in this application and the said prior applications, comprise elements operating at substantially right angles and continuously forming combustion chambers therebetween. One of the movable elements is of a chain or transmission belt type, endless in construction and passing around wheels to keep the chain or belt tight in operation. The present invention is more particularly directed to the chain construction or element. The chain or belt, however, while particularly adapted for such use, is not confined thereto, as it is susceptible of general application wherever a belt or chain of its type may be utilized.

The objects of the present invention are to provide a chain construction which will maintain its gear elements or travelers in accurate relationship; to counteract centrifugal action upon the movable elements during passage of the same around their guide supports at the ends of their oribital path; to maintain a guide support at an outer part of said members in passing around the curved ends of their guide track and relieving the strain on the inner carrier belt; to provide for taking up the slack between two or more of the members; to secure simplicity of construction and operation; and to obtain other advantages and results as hereinafter more fully set forth in the following description.

Referring to the accompanying drawings in which like numerals of reference indicate similar parts throughout the several views:

Fig. 1 is a sectional plan view through the gear element chain embodying my invention, and Fig. 2 is a transverse sectional view on line 2—2 of Fig. 1.

In the specific embodiment of the invention illustrated in said drawings, reference numeral 201 indicates travelers in the form of teeth or chamber forming members. There are a plurality of these travelers or teeth arranged successively and in spaced relation to each other. The space between adjacent teeth or members 201, in the embodiment of the invention in a rotary engine of the type described, is sufficient to receive therebetween a coacting part of the engine not necessary to be herein shown as it forms no part of my present invention, but which is described more in detail in my prior applications Ser. No. 236,905 and Ser. No. 331,626 above referred to.

The feature of the present invention resides more particularly in a transmission belt construction constituting the supporting and driving means for the teeth or travelers. Each tooth or traveler 201, as shown, is mounted upon a carrier bracket 225 through which runs a trunnion axle 246. Passing through the carrier brackets is a control belt comprising a plurality of belt members 236—236', the object of which will be explained thereafter. These brackets are arranged to pass around an orbital track or path, being guided by means of rails 223 and 224 on which travel guide sleeves or rollers 226—227 journaled on the axles 246. The rails 223—224 may be formed or provided upon a support 247.

The brackets are held in spaced relationship and moved through their path of travel by means of a flexible belt 209 to which they are fastened, as, for example, by bolts 210. The carrier belt 209 maintains the elements 201 in properly spaced and parallel relationship during their travel along the rectilinear parts of their orbital courses, while permitting them to assume an angular relationship in passing around the curved ends of the course. The brackets 225 are also sustained and supported by the belt members 236—236' through the bearing engagement of said belt members with and their control pressure on the axles 246. The belts 236—236', of which one of the former and a pair of the latter are used, alternately pass first on one side of each axle and then on the opposite side thereof, the belts 236—236' crossing each other between the axles and passing in zig-zag order about the series of axles.

By this arrangement of the belts 236—236' an easy motion of the carrier brackets and gear elements carried thereby around the curved end portions of the track is ensured and outward movement of the gear elements, i. e., movement of such gear elements away from the track under centrifugal force, is prevented, as the use of crossed control belts allows greater chordal length of each belt portion engaging the trunnion shafts by engagement of alternate trunnion shafts of the series of trunnion shafts of the belt, whereby the carrier brackets passing around the curved ends of the belt are permitted to more readily assume a divergent relationship which is compensated for by the flexibility secured by such increased chordal length between portions of the belts engaging the trunnion shafts. The belts 236—236' may thus be made sufficiently flexible to readily travel about the track ends without the necessity of making them either unduly rigid or of elastic material in order to prevent distortion of the belts and outward movements of the brackets by centrifugal force and the resulting resistance to free travel of the belt at these points owing to the change of the brackets from parallel to divergent relationship. Furthermore, the belts 236—236' serve to sustain the shafts, maintain the shape of the gear element and allow sufficient flexibility to prevent the belt from stretching.

I claim:—

1. An endless carrier comprising an endless trackway, a series of carrier elements traversing said trackway and a plurality of carrier belts, one of said belts supporting and maintaining the carrier elements in presented spaced relationship for travel about the trackway and another of said belts acting to prevent outward displacement of the carrier elements by centrifugal force at the ends of the trackway.

2. A transmission belt comprising an endless trackway, a carrier belt arranged to travel about the trackway, a series of carrier brackets pivotally mounted upon the carrier belt and equidistantly spaced in relative position thereby, and a control belt embodying belt members disposed on the outer side of the carrier belt and extending in crossed relation to each other between the pivotal axes of the brackets and alternately on opposite sides of and engaging said pivotal axes to permit ready shift of the brackets to divergent angular positions and to prevent outward movement of said brackets under centrifugal force at the ends of the trackway.

3. A transmission belt comprising an endless trackway, a carrier belt arranged to travel about the trackway, a series of U-shaped carrier brackets pivotally mounted upon the carrier belt and equidistantly spaced in relative position thereby, and a control belt embodying belt members disposed on the outer side of the carrier belt and extending in crossed relation to each other between the pivotal axes of the brackets and alternately on opposite sides of and engaging said pivotal axes to permit ready shift of the brackets to divergent angular positions and to prevent outward movement of said brackets under centrifugal force at the ends of the trackway.

4. A gear element comprising an endless member composed of concentric flexible belts, means for mounting teeth on a first belt, said first belt regulating the equidistance between the teeth and the other belts overcoming centrifugal action in the displacements of the teeth on their path.

5. A gear element comprising an endless member composed of concentric flexible belts, stirrups bolted on the first belt, teeth fixed to said stirrups, said first belt regulating the equidistance between the teeth and the other belts overcoming centrifugal action in the displacements of the teeth on their path.

6. A gear element comprising an endless member composed of concentric flexible belts, stirrups bolted on the first belt, teeth fixed to said stirrups, said first belt regulating the equidistance between the teeth, trunnions traversing the stirrups, on both ends of said trunnions means for guiding the teeth in their displacements, the other belts crossing each other between two successive trunnions and overcoming the centrifugal action in the displacements of the teeth.

MAURICE COUSIN.